United States Patent [19]

Jelens

[11] Patent Number: 4,561,224
[45] Date of Patent: Dec. 31, 1985

[54] SLIDING WINDOW ASSEMBLY FOR A VEHICLE

[75] Inventor: David P. Jelens, Kentwood, Mich.

[73] Assignee: GRM Industries, Inc., Grand Rapids, Mich.

[21] Appl. No.: 571,324

[22] Filed: Jan. 16, 1984

[51] Int. Cl.$^4$ ............................................... E06B 1/04
[52] U.S. Cl. ...................................... 52/207; 52/726; 52/656; 49/130; 296/201
[58] Field of Search ................. 52/207, 206, 726, 536, 52/539, 208, 658, 656; 49/213, 130, 504; 296/201, 155, 84 A, 84 D, 146

[56] References Cited

U.S. PATENT DOCUMENTS 2,317,312  4/1943  Swanson et al. ...................... 49/130

FOREIGN PATENT DOCUMENTS 80587   6/1983  European Pat. Off. ............ 296/201
583735 12/1946  United Kingdom ................... 49/130

Primary Examiner—Carl D. Friedman
Assistant Examiner—Naoko N. Slack
Attorney, Agent, or Firm—Cullen, Sloman, Cantor, Grauer, Scott & Rutherford

[57] ABSTRACT

A sliding window assembly is flush mountable within a window opening in the body of a vehicle and includes a frame nested and sealed within the body. A fixed or stationary window is mounted and sealed within one end of the frame. Opposed top and bottom inwardly curved first and second channel tracks are formed within the frame. A slidable window is mounted and sealed within the frame and aligned with the stationary window. Opposed longitudinally spaced first and second guide pins on the top and bottom of the slidable window extend into the first and second tracks respectively. On retraction of the slidable window, it is positioned upon the interior portion of the vehicle parallel to and spaced inwardly of the stationary window.

22 Claims, 14 Drawing Figures

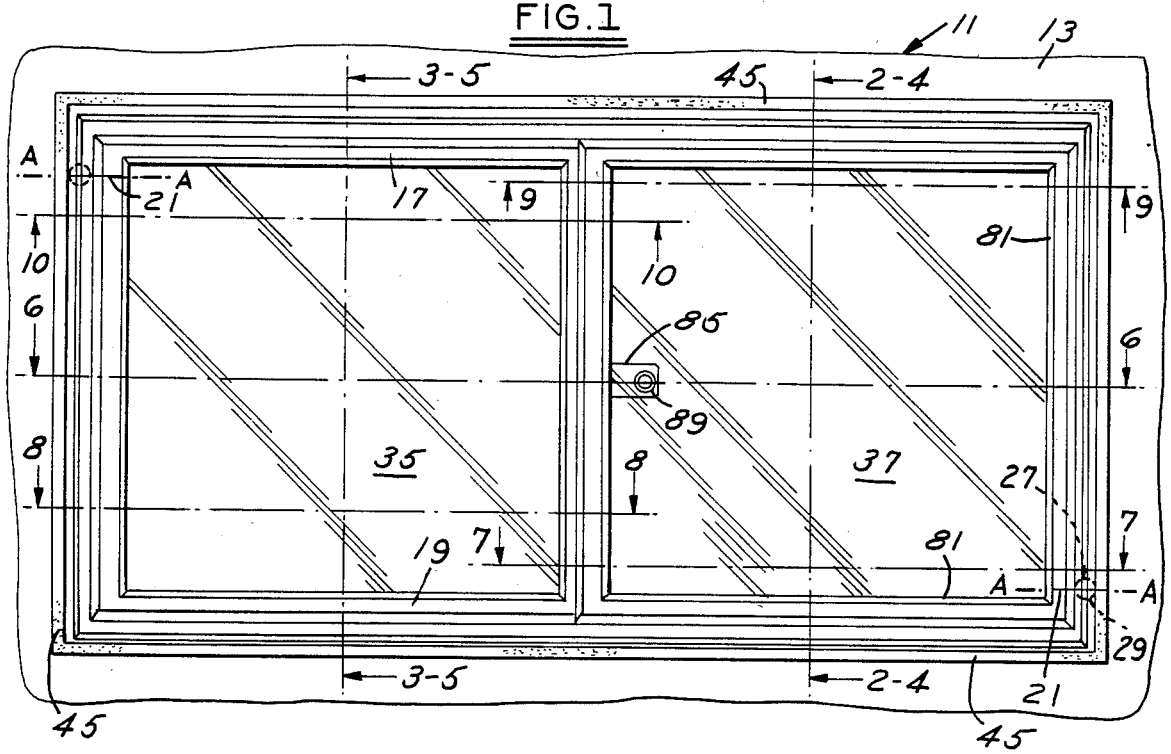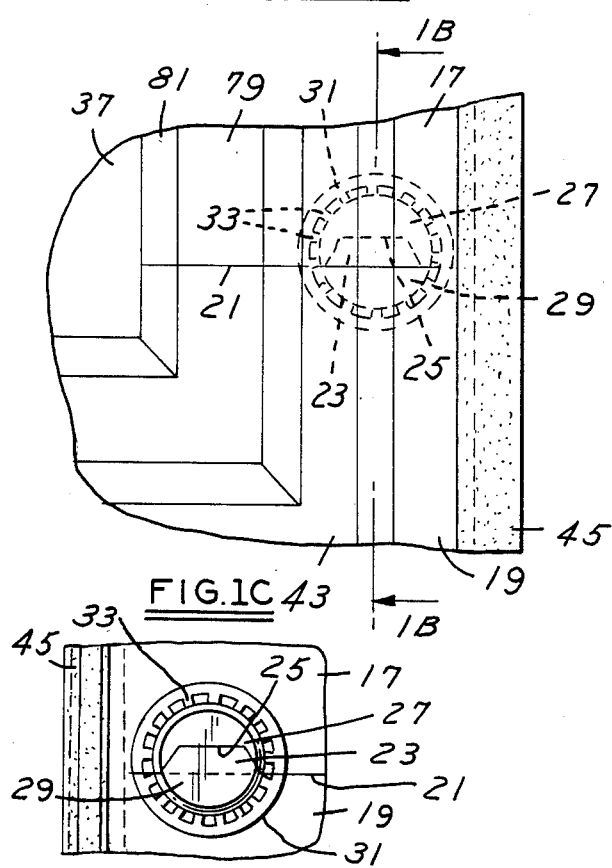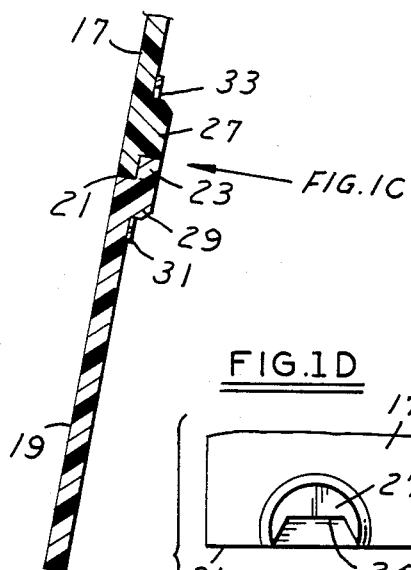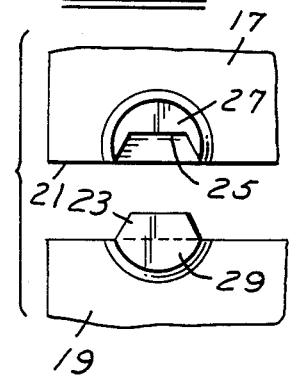

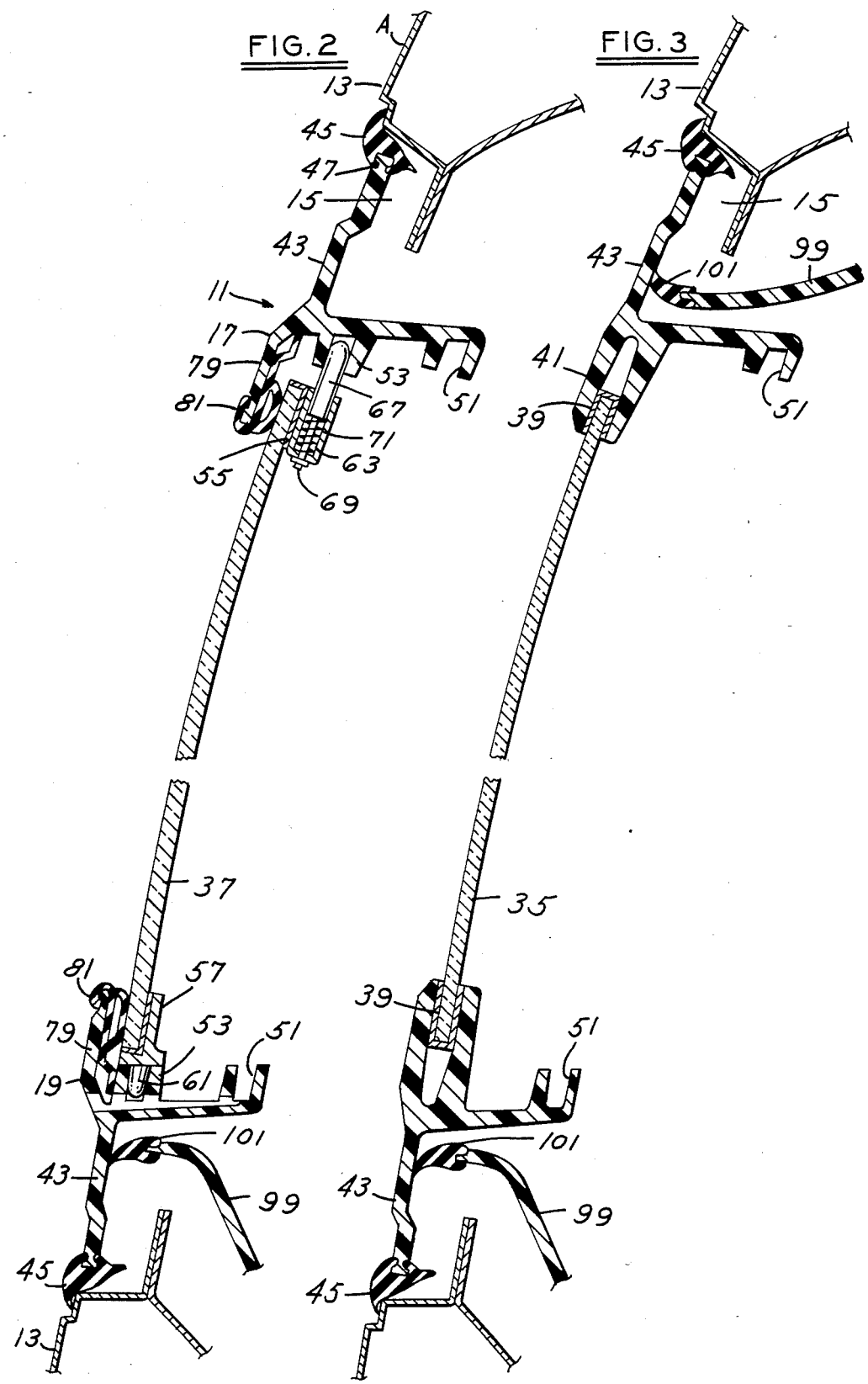

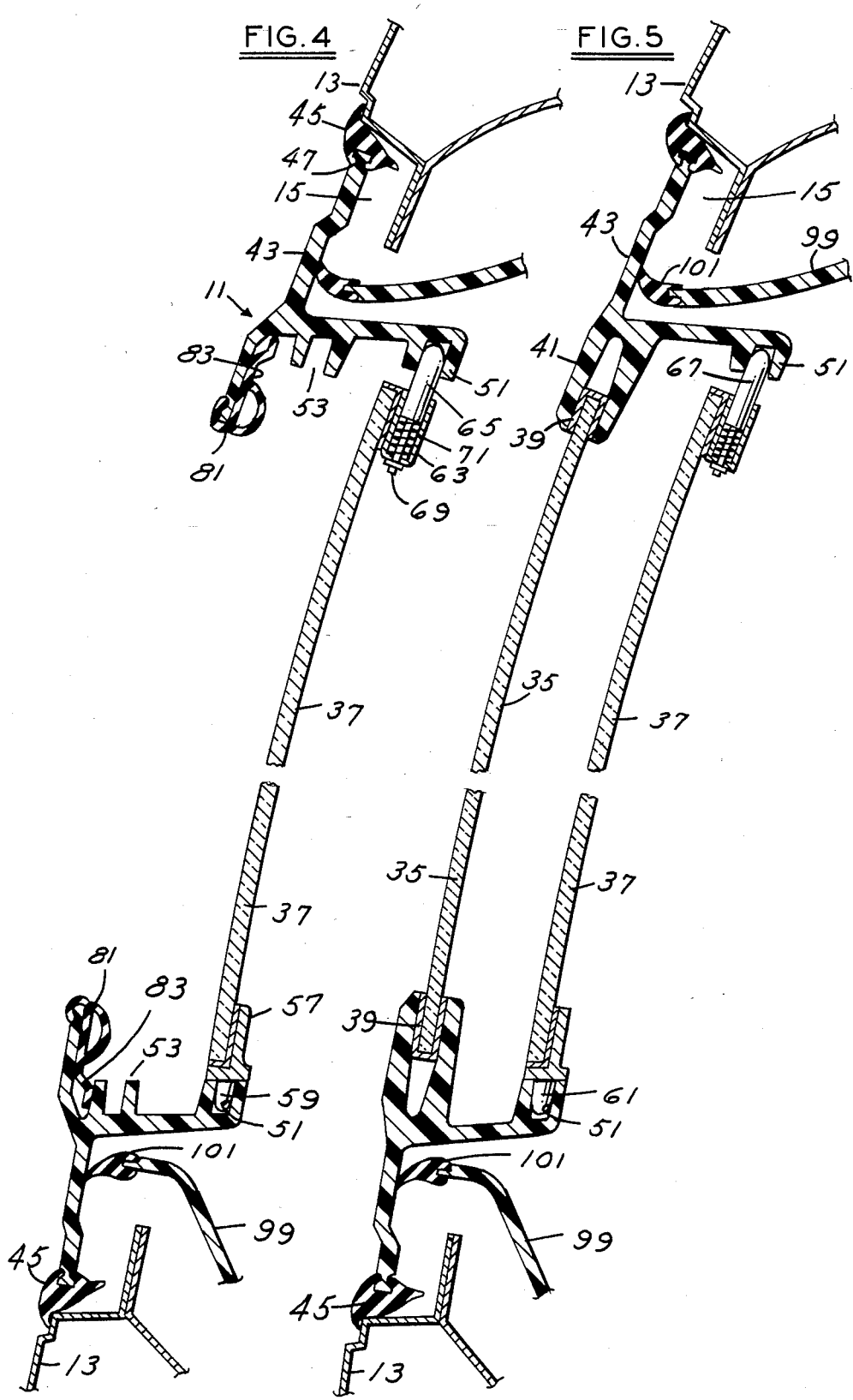

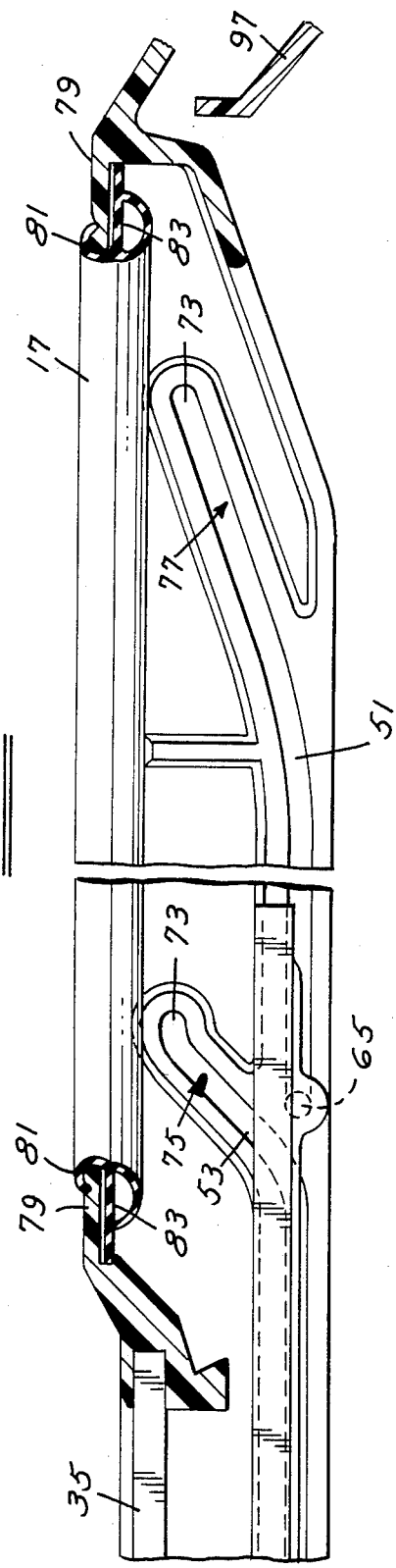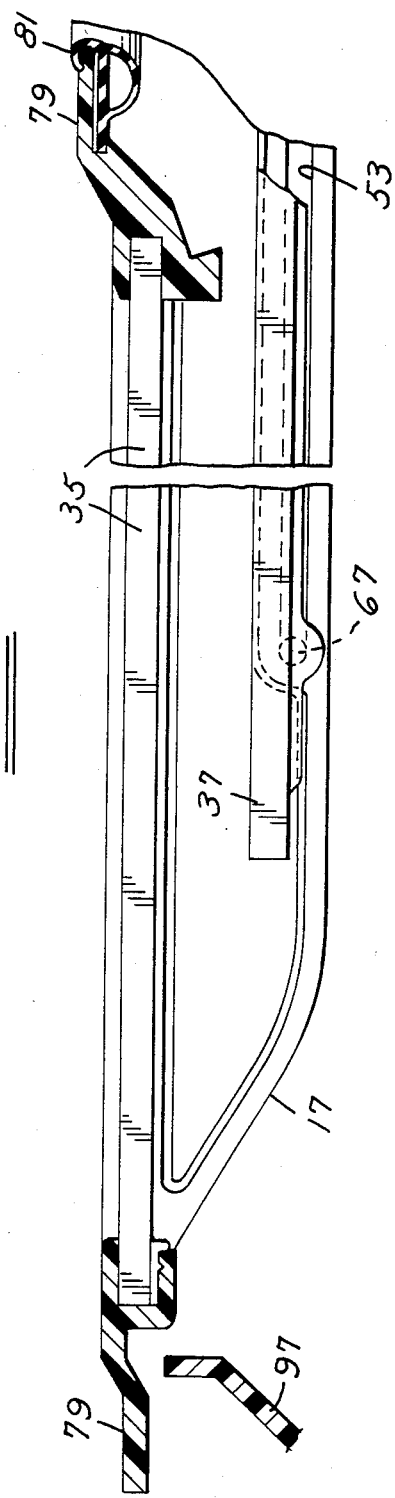

SLIDING WINDOW ASSEMBLY FOR A VEHICLE

BACKGROUND OF THE INVENTION

European standards do not allow road vehicles to have protruding appendages upon the side of the vehicle, except for rear view mirrors. In the application of sliding vent windows particularly to the sides of vehicles, it is required that the window when closed is entirely flush with the outside of the body and in water and air tight sealing relation therewith. It is further required that when the window is opened to provide ventilation, there should still nevertheless be no protruding frames inside or outside of the vehicle. It is my desire to apply these standards to vehicles assembled for the U.S. market.

A further problem existing in the use of sliding vent windows is to achieve the desired motion of the sliding window within various vehicle openings and in accordance with vehicle side contours which include compound curvatures. Currently, there is the existing requirement of fit and function, under today's desired goal and with critical dimensional tolerances for periphery fit to the vehicle and to a flush fit to the outside of the vehicle.

A further problem is the considerable difficulty in the slide mounting of the window so that it will be in alignment with the body curvature when in a closed position and in peripherally sealed relation to the body and which when retracted upon the interior of the vehicle will be spaced inwardly of the body or an adjacent window, parallel to and on an interior thereof, without protrusion into the interior of the body.

One form of sliding window assembly for a vehicle is shown in the U.S. Pat. No. 4,124,054 of Steve A. Spretnjak entitled "Window Assembly for a Vehicle", which issued on Nov. 7, 1978.

SUMMARY OF THE INVENTION

It is an important feature of the present invention to provide within a window opening in the body of a vehicle including trucks, vans and autos of a framework for mounting a sliding vent window which will be substantially flush with the exterior curvature of the vehicle when closed and when slidably opened will provide ventilation and will not protrude upon the inside or outside of the vehicle.

Another feature is to provide a sliding window which will be air sealed and water sealed when closed and which when moved to an open position for ventilation of the vehicle interior is snugly disposed upon the interior of the vehicle generally parallel to the body wall or a stationary window so as not to obstruct any portion of the interior or exterior of the vehicle.

A further feature is to provide a unique elongated continuous frame which is nested within an opening in the vehicle body and peripherally sealed and retained therein.

A still further feature is to provide within the frame at one end thereof a stationary window sealed therein and generally within the contour of the vehicle body and wherein there is also formed within the frame opposed top and bottom first and second tracks molded into the frame and wherein a slidable window is supported and guided within the respected tracks which are so formed that the slidable window when fully closed is in alignment with the stationary window and within the general contour of the vehicle body and which when retracted for ventilation moves upon the interior of the vehicle in a non-obstructing position therein inwardly of and parallel to the stationary window.

Another feature is to provide a unique plastic frame design construction which consists of top and bottom frame sections which are symmetrical and which when assembled and secured together are in general alignment from end to end and from top to bottom in accordance with the compound curvature on the exterior of the vehicle body, with the frame having an excellent peripheral fit to the vehicle body and a flush fit to its exterior.

It is a further feature to provide a frame having top and bottom sections made from a plastic material, preferably a reinforced thermoplastic material.

A still further feature contemplates the formation of a unit frame from a pair of top and bottom frame elements having upwardly extending and downwardly extending end portions, respectively, which are vertically aligned in corresponding registry and secured as assembled to provide a unit frame shaped and formed within the general plane of the vehicle body and with interior and exterior portions of the frame being in alignment.

Another feature contemplates the use of a continuous frame which has opposed top and bottom inwardly curved first channel tracks formed within one end portion of the frame, with opposed top and bottom inwardly curved second channel tracks formed within another portion of the frame, generally arranged inwardly of the vehicle body and wherein the first and second tracks have longitudinally aligned entrant openings. A slidable window is mounted upon the frame aligned with the stationary window when closed and includes longitudinally spaced outwardly directed first and second guide pins which extend respectively into the first and second channel tracks. Upon retraction of the slidable window, it moves within the first and second tracks and is displaced laterally inward within the body and parallel to the stationary window when fully opened.

These and other features and objects will be seen from the following Specification and claims in conjunction with the appended drawings.

THE DRAWINGS

FIG. 1 is a fragmentary side elevational view of a vehicle body upon which is mounted the present sliding window assembly.

FIG. 1A is a fragmentary side elevational portion of the assembled frame as taken along the joint lines A—A of FIG. 1, on an increased scale to illustrate the interlocking registry of the adjacent registering portions of the frame sections.

FIG. 1B is a fragmentary section taken in the direction of arrows 1B—1B of FIG. 1A.

FIG. 1C is a fragmentary elevational view of adjacent portions of secured upper and lower frame sections after assembly.

FIG. 1D is a similar view of the upper and lower frame sections before assembly.

FIG. 2 is a fragmentary vertical section taken in the direction of arrows 2—2 of FIG. 1, with the slidable window closed and on an increased scale.

FIG. 3 is a similar view taken in the direction of arrows 3—3 of FIG. 1.

FIG. 4 is a section taken in the direction of arrows 4—4 of FIG. 1, with the sliding window opened.

FIG. 5 is a similar view taken in the direction of arrows 5—5 of FIG. 1, with the sliding window opened.

FIG. 9 is a fragmentary section taken in the direction of arrows 9—9 of FIG. 1, on an increased scale and with the sliding window open.

FIG. 10 is a similar view taken in the direction of arrows 10—10 of FIG. 1, on an increased scale.

Figure 6:
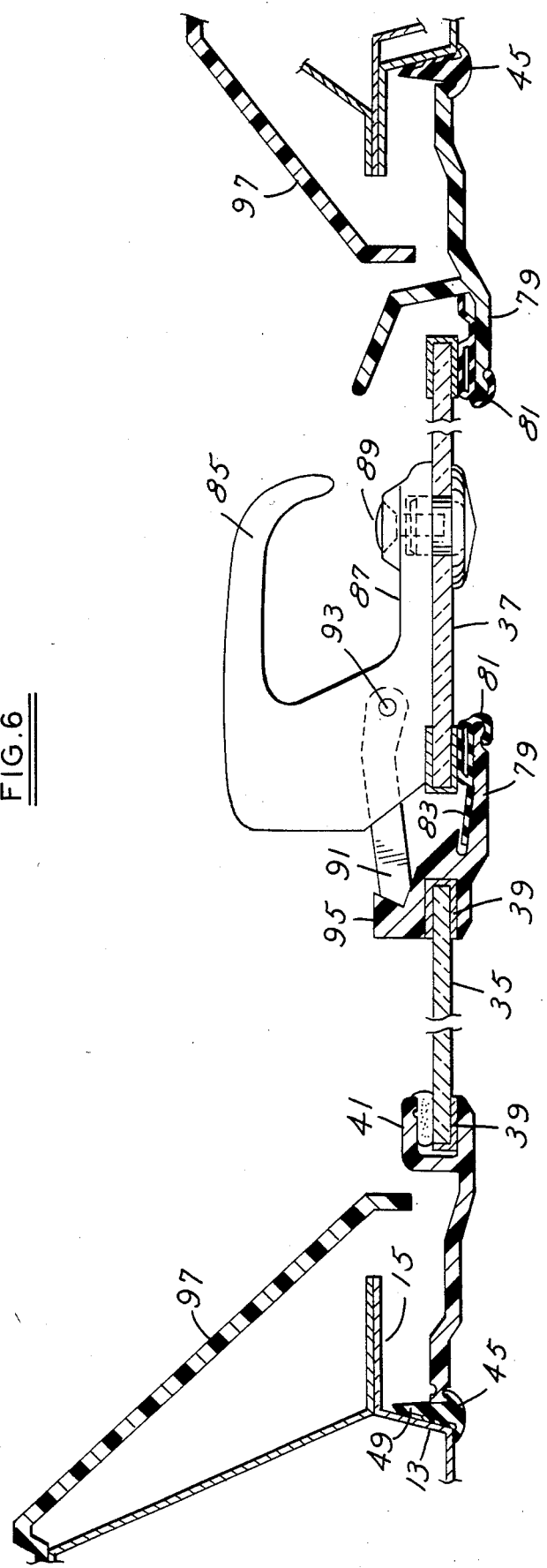
FIG. 6 is a fragmentary section taken in the direction 6—6 of FIG. 1, on an increased scale.

It will be understood that the drawings illustrate merely a preferred embodiment of the invention and that other embodiments are contemplated within the scope of the claims hereafter set forth.

DETAILED DESCRIPTION OF AN EMBODIMENT OF THE INVENTION

Referring to the drawings, FIG. 1, the present flush mounted sliding window assembly generally indicated at 11 is mounted within an elongated generally rectangular window opening 15, FIG. 2, within the side or rear of the vehicle body 13 including trucks, vans and autos.

An elongated continuous frame is nested within the opening 15 and is peripherally sealed and retained within the body 13. The frame includes an upper frame section or element 17 and a lower frame section or element 19 preferably constructed of a reinforced thermoplastic material. The frame sections 17-19 when assembled and secured provide a unit frame 17-19 within which the present sliding window 37 is adjustably mounted.

As designated at the lines A—A on FIG. 1, there are shown joint lines 21 at diametrically opposed opposite ends of the window frame 17-19. At either of the joint lines 21, shown in FIGS. 1A and 1B, a downwardly extending portion of the upper frame section 17 is in vertical registry with the corresponding upstanding portion of the lower frame section 19.

Within one of the registering upwardly and downwardly extending portions of the frame elements 17 and 19, at the joint line 21, there is formed tongue 23 of irregular shape, such as W-shape shown in dash lines in FIG. 1A, which is in cooperative snug registry with the correspondingly shaped groove 25 located within the other of the aligned registering portions of the upper and lower frame elements, shown separated in FIG. 1D and shown snugly assembled end to end in FIG. 1C.

Each of the aligned registering portions of the upper and lower frame elements 17 and 19 has formed therein a semi-circular boss element 27 and 29 which when in snug registry at the joint line 21, FIGS. 1A and 1B, form a circular boss over which is positioned and snugly secured a heat treated spring steel ring 31. The ring 31 secures together the corresponding aligned elements of the upper and lower frame sections 17 and 19.

The steel ring 31 has upon its interior a series of radially extending barbs 33 which are adapted to bite into adjacent portions of the corresponding boss elements 27 and 29 for effectively securing those portions of the upper and lower frame sections 17-19 together at the joint lines A—A, FIG. 1.

Mounted within the frame 17-19 at one end portion thereof is the window 35 which is normally stationary. Mounted upon the other end portion of the frame on its interior or inner side is the slidable window 37. The slidable window 37 when closed is in longitudinal alignment with the stationary window 35 and is located within the contour of the unit frame defined by the upper and lower frame sections 17 and 19.

As shown in FIGS. 1 and 3, the stationary window 35 includes a peripheral channel molding 39 therearound which projects into and is sealed within corresponding opposed top, bottom and end channels 41 formed within the frame 17-19. Upon the unit assembled frame 17-19, there is provided a peripheral outwardly extending flange 43 which mounts along and around its perimeter an elongated peripheral sealing bead 45. The bead 45 snugly fits within body opening 15 and is sealed and retained therein.

As shown in FIG. 2, peripheral portions of the flange 43 extending around the frame 17-19 have an interlock as at 47 with interior portions of the peripheral sealing bead 45 so that the sealing bead 45 is effectively secured to the outer periphery of the continuous flange 43. This provides an effective means for sealing the entire frame 17-19 which is secured within the window opening 15 located in the vehicle body 13.

Illustrated in FIG. 6, the respective peripheral bead 45 has upon one side thereof a series of outwardly extending flexible anchor retention fingers 49 adapted for operative retaining engagement with adjacent portions of the vehicle body 13 adjacent the window opening 15. A suitable sealing cement may be employed for further anchoring the peripheral seal 45 within window opening 15 and within vehicle body 13.

Referring to FIGS. 7, 8, 9 and 10, opposed top and bottom inwardly curved first channel tracks 51 are formed upon the interior of the frame 17-19 at the end portion thereof remote from that portion of the frame which contains the usually stationary window 35. Opposed top and bottom inwardly curved second channel tracks 53 are formed within said one end of the frame spaced inwardly of stationary window 35.

Mounted upon and surrounding the slidable window 37 is a frame 55 of L-shape in cross-section, FIG. 2. An elongated pin support strip 57 is mounted upon and along the lower edge of frame 55 for the slidable window 37 and has depending therefrom longitudinally spaced first and second bottom guide pins 59 and 61 respectively. The bottom guide pins 59 and 61 are adapted for sliding projection within the corresponding first and second bottom channel tracks 51 and 53 respectively.

Mounted upon the interior of the window frame 55 at the top edge of the slidable window 37 are a pair of longitudinally spaced upwardly opening sockets 63 within which are yieldably mounted first and second guide pins or spring pins 65 and 67.

Each of the spring pins 65 and 67 has an axial guide rod 69, which extends through the bottom of the corresponding socket 63 and is retained thereon. A compression spring 71 is nested within each of the sockets 63 and is interposed between the socket 63 and the inner end portion of the corresponding spaced top first and second guide pins 65 and 67. Thus, the pins 65 and 67 are spaced upon top portions of the retractable window 37 upon the interior side thereof and are yieldably and guidably mounted respectively within the corresponding first and second tracks 51 and 53 located upon the interior upper portion of unit frame 17-19.

Figure 7:
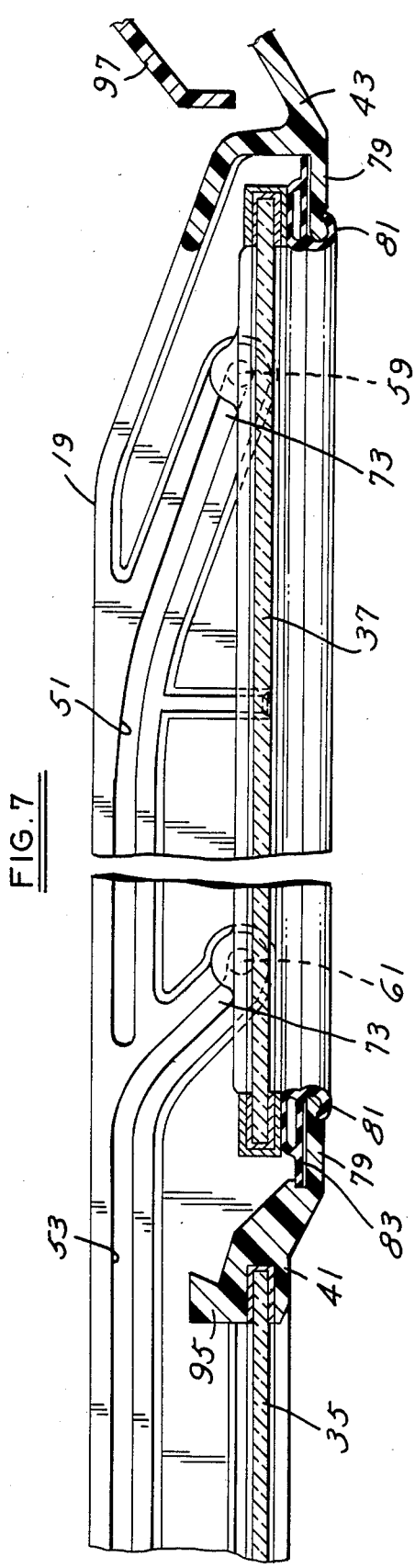
FIG. 7 is a fragmentary section taken in the direction of arrows 7—7 of FIG. 1, on an increased scale.
Figure 8:
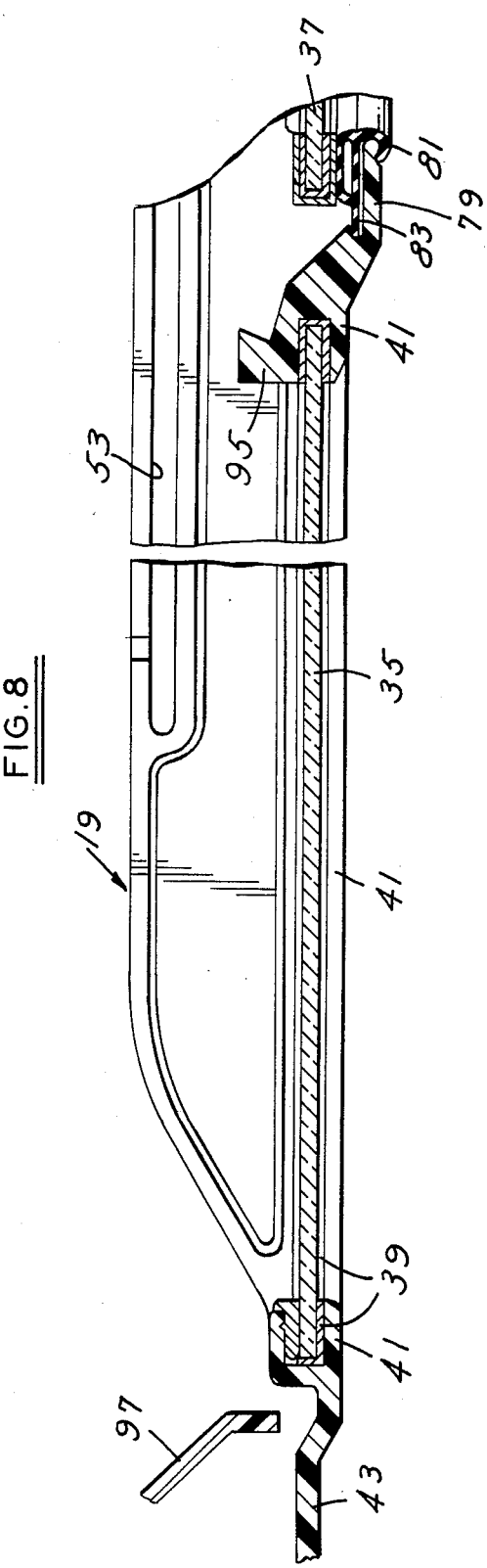
FIG. 8 is a fragmentary section taken in the direction of arrows 8—8 of FIG. 1, on an increased scale.

As shown in FIG. 7, the entrant end portions 73 of the first and second tracks 51 and 53 are in longitudinal alignment so that the slidable window 37 when in its closed position is arranged flush with the vehicle body contour and in longitudinal alignment and coplanar with stationary window 35 and within the curvature of the unit frame 17-19.

The respective top and bottom first channel tracks 51 extend from their entrant ends at acute angles 77, FIG. 9 such as 30° approximately, whereas the entrant ends of the second channel tracks 53 extend from the entrant openings thereof also at an acute, but sharper angle 45° approximately. This is necessary so that the leading portion of the slidable window 37 when retracted will move inwardly so as to clear adjacent interior portions of the frame elements 17-19.

The corresponding other ends of the respective channel tracks 51 and 53 are in longitudinal alignment so that when the retracted window 37 is fully retracted, it will be positioned upon the interior of the vehicle body 13 closely adjacent to and parallel to the stationary window 35, so as not to protrude upon the interior or exterior of the vehicle body.

An inner continuous peripheral flange 79 is formed within the frame 17-19 outwardly of the retractable slidable window 37 when in its closed position, and extends throughout 360°. Continuous sealing bead 81 is mounted upon the flange 79 around its periphery and is in cooperative air and water sealing engagement with exterior portions of the slidable window 37 when fully closed, as in FIG. 1 and FIG. 7. The bead 81, FIG. 6, includes a continuous interior anchor strip 83 which extends into and along interior portions of flange 79 throughout its periphery for anchoring thereto.

A suitable sealing cement may be employed, if desired to improve on the anchoring of the sealing bead 81 within, upon and around the flange 79 forming a part of the frame 17-19 for sealing the slidable window 37 when fully closed.

As shown in FIG. 6, upon the interior of the slidable window 37 there is provided a handle 85 of general C-shape which is mounted intermediate the top and bottom thereof adjacent one of its edges. The handle 85 includes a flat base 87 which bears against the interior of the window and is secured thereto by a suitable fastener assembly 89, such as a combination rivot fastener or the like. Latch 91 at one end is pivotally mounted at 93 upon the handle 85 and its forward end is normally in an interference retaining engagement with the latch anchor 95 forming a part of the frame 17-19 upon its interior. This serves to lock the sliding window 37 in position. Upon swinging of latch 91 inwardly about its pivot for disengagement with latch anchor 95, the slidable window 37 may be retracted as guidably mounted with respect to the first and second opposed pairs of top and bottom tracks 51 and 53 until the slidable window 37 has moved to the final open position, FIGS. 9 and 10.

As shown in FIGS. 2, 3, 4, and 5, mounted upon the vehicle body 13 and extending outwardly thereof relative to the window opening 15 therein, there is provided a continuous seal flange 99 mounting upon its outer edge a continuous flexible seal 101 which is in operative sealing engagement with the interior of the frame peripheral flange 43.

Thus as shown in the drawings, the retractable window 37 when fully closed is peripherally sealed against air and moisture with respect to suitable sealing means 81 upon the exterior of the frame 17-19. The retractable window 37 is maintained within the general plane of frame 17 and 19 corresponding to the compound shape of adjacent portions of vehicle body 13. The retractable or sliding window 37, when closed, is entirely flush with the exterior contour of the vehicle body 13 and when opened to provide ventilation is projected upon the interior of the vehicle body 13 inwardly of, parallel to and spaced from the stationary window 35 in a nonprotruding position therein and within the boundary of frame elements 17 and 19.

The present invention contemplates an improved method for moving the sliding window 37 to its closed position where it is sealed with respect to the window frame. The window 37 is guidably positioned within the frame utilizing guide pins 59 and 61 and the spring biased top guide pins 65 and 67 which move within the corresponding first and second channel tracks formed within top and bottom portions of the frame. Thus, there is achieved the desired motion for the sliding window 37 so that it is always maintained within the compound curving exterior surface portions of the adjacent body 13.

This accuracy of positioning is further achieved by the use of applicant's molded plastic frame elements along with the spring loading of the upper guide pins upon the sliding window 37. By constructing the frame of a plastic material and in this case a reinforced thermoplastic, rather than aluminum or other metal, requirements as to fit and function under today's desired goals permit such dimensional tolerances for a peripherally fit into the vehicle so that there is a flush fit of the slidable window 37 with respect to the outside contour of the vehicle.

The present construction of the plastic frame sections secured together in alignment provides for dimensional accuracy of the window frame so that the periphery of the window is in exact registry with the upper and lower frame sections and throughout the surface portions of the unit window frame.

The present invention is directed to a sliding window assembly for a vehicle having a frame which may include any of the following window options: (a) one sliding window; (b) a pair of sliding windows; (c) a pair of windows, with one stationary and one sliding. The sliding window may be mounted in the frame either interiorly or exteriorly of the stationary window, if one is provided.

Having described my invention, reference should now be had to the following claims.

I now claim:

1. A sliding window assembly flush mountable within an elongated window opening within the body of a vehicle comprising;
   an elongated continuous frame nested within said opening and peripherally sealed and retained within said body;
   a stationary window mounted and sealed within one side of said frame;
   opposed top and bottom inwardly curved first channel tracks formed within the other side of said frame;
   opposed top and bottom inwardly curved second channel tracks formed within said one side of said frame spaced inwardly of said stationary window;
   said first and second tracks having longitudinally aligned entrant openings;
   a slidable window mounted upon said frame aligned with said stationary window when closed;
   opposed longitudinally spaced outwardly directed first and second guide pins upon said slidable window, with said first guide pins extending into said first channel tracks and said second guide pins extending into said second channel tracks;

said pins on retraction of said slidable window moving within said first and second tracks and said slidable window being displaced laterally inward and parallel to said stationary window when opened;

said frame including opposed symmetrical vertically aligned upper and lower frame sections;

said sections at their ends respectively having opposed aligned downwardly and upwardly extending end portions defining a transverse joint line;

there being an irregularly shaped transverse slot in one of said end portions at said joint line and a correspondingly shaped transverse tongue in the adjacent end portion at said joint line, in snug interlocking registry respectively; and means securing said interlocked aligned end portions together to form a unit frame.

2. In the window assembly of claim 1, said frame including a continuous peripheral flange laterally outward of said other side of said frame;

and a continuous peripheral seal anchored upon said flange and in cooperative peripheral sealing engagement with said sliding window when closed.

3. In the window assembly of claim 2, said peripheral seal being so arranged upon said frame relative to said slidable window as to render said slidable window airtight and watertight when closed.

4. In the window assembly of claim 1, said frame including a continuous peripheral flange upon and along its outer perimeter;

and a continuous peripheral seal mounted upon said flange and nested within in said window opening and in cooperative registry with said body.

5. In the window assembly of claim 4, a continuous peripheral flange on said body extending outwardly thereof;

and a continuous flexible seal on said body flange in cooperative registry with the interior of said frame peripheral flange.

6. In the window assembly of claim 1, said joint lines being arranged at diametrical opposite ends of said assembled frame sections.

7. In the window assembly of claim 1, said slot and tongue at said joint line being substantially W-shaped.

8. In the window assembly of claim 1, said means for securing together the aligned end portions of said frame sections including a sectional circular boss laterally of said end portions at said joint line respectively;

and a metal ring surrounding and compressively retaining said sectional circular bosses in securing registry.

9. In the window assembly of claim 8, each ring having a plurality of inner radially extending barbs frictionally projected into and interlocked with said sectional circular bosses.

10. In the window assembly of claim 1, said spaced upper guide pins on said slidable window being spring biased outwardly.

11. In the window assembly of claim 10, the mounting of each of said upper guide pins including an upright open socket at the upper edge of said slidable window;

said upper guide pins being slidably mounted in said socket;

and a coiled compression spring interposed between said socket and pin.

12. In the window assembly of claim 9, said slidable window including a peripheral flange of L-shape;

said sockets being secured to said frame along its top edge upon the interior of said slidable window.

13. In the window assembly of claim 1, the mounting of said stationary window including connecting continuous opposed top, bottom and end channels formed in said frame on said one side thereof.

14. In the window assembly of claim 1, the entrant openings of said second tracks extending along said frame and positioned laterally inward of said other side of said frame and overlapping the ends of said first tracks respectively.

15. In the window assembly of claim 1, said first and second tracks at the top and bottom of said frame respectively being coplanar.

16. In the window assembly of claim 1, said first and second tracks at their one ends adjacent their entrant openings being inclined laterally inward at an acute angle;

the corresponding other ends of said first and second tracks being in longitudinal alignment, for positioning and maintaining said sliding window within said body and parallel to said stationary window when fully retracted.

17. In the window assembly of claim 1, the mounting of said longitudinally spaced pins at the bottom of said slidable window including an elongated pin support strip secured along the lower edge of said slidable window, said pins depending from said support strip.

18. In the window assembly of claim 1, said frame being formed of a reinforced thermoplastic material.

19. In the window assembly of claim 1, a handle secured upon the interior of said slidable window intermediate its top and bottom and adjacent one upright edge thereof;

and a latch pivotally mounted upon said handle, at its free end in interference registry with said frame and adapted for manual pivotal movement out of such interference registry before retraction of said window.

20. In the window assembly of claim 1, said slidable window being so mounted within said frame as to be substantially flush with the outside contour of the vehicle body when closed and non-protruding upon the inside of said body when retracted for ventilation.

21. A sliding window assembly flush mountable within an elongated window opening within the body of a vehicle comprising;

an elongated continuous frame nested within said opening and peripherally sealed and retained within said body;

opposed top and bottom inwardly curved first channel tracks formed within said frame;

opposed top and bottom inwardly curved second channel tracks formed within said frame spaced inwardly of said body;

said first and second tracks having longitudinally aligned entrant openings;

a slidable window mounted upon said frame aligned with said body when closed; and opposed longitudinally spaced outwardly directed first and second guide pins upon said slidable window, with said first guide pins extending into said first channel tracks and said second guide pins extending into said second channel tracks;

said pins on retraction of said slidable window moving within said first and second tracks and said slidable window being displaced laterally inward and parallel to said body when opened;

said frame including opposed symmetrical vertically aligned upper and lower frame sections;

said sections at their ends respectively having opposed aligned downwardly and upwardly extending end portions defining a transverse joint line;

there being an irregularly shaped transverse slot in one of said end portions at said joint line and a correspondingly shaped transverse tongue in the adjacent end portion at said joint line, in snug interlocking registry respectively; and means securing said interlocked aligned end portions together to form a unit frame.

22. In the window assembly of claim 21, said frame including a continuous peripheral flange laterally outward of said slidable window;

and a continuous peripheral seal anchored upon said flange and in cooperative peripheral sealing engagement with said sliding window when closed.

* * * * *